(12) United States Patent
Kroyer (10) Patent No.: US 11,187,494 B2
(45) Date of Patent: Nov. 30, 2021

(54) MODULAR MISSILE LAUNCH SYSTEM FOR LAUNCHING MISSILES FROM A MOBILE PLATFORM

(71) Applicant: MBDA Deutschland GmbH, Schrobenhausen (DE)

(72) Inventor: Robert Kroyer, Munich (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 0 days.

(21) Appl. No.: 17/084,160

(22) Filed: Oct. 29, 2020

(65) Prior Publication Data

US 2021/0131763 A1     May 6, 2021

(30) Foreign Application Priority Data

Oct. 30, 2019    (DE) .......................... 102019007557.9

(51) Int. Cl.
    *F41F 3/065*       (2006.01)
    *F41F 3/052*       (2006.01)

(52) U.S. Cl.
    CPC .............. *F41F 3/065* (2013.01); *F41F 3/052* (2013.01)

(58) Field of Classification Search
    CPC .. F41F 3/065; F41F 3/052; F41F 3/055; F41F 3/042
    See application file for complete search history.

(56) References Cited

U.S. PATENT DOCUMENTS

| 5,400,689 | A | | 3/1995 | Hutter et al. |
| 6,125,734 | A | * | 10/2000 | Yagla ...................... F41F 3/042 89/1.8 |
| 10,408,567 | B1 | | 9/2019 | Carver, II |

(Continued)

FOREIGN PATENT DOCUMENTS

| GB | 2188713 A1 | 10/1987 |
| RU | 2539434 C1 | 1/2015 |
| WO | 19168643 A1 | 9/2019 |

OTHER PUBLICATIONS

Office Action for German Patent Application No. 102019007557.9 dated Jul. 30, 2020.

(Continued)

*Primary Examiner* — J. Woodrow Eldred
(74) *Attorney, Agent, or Firm* — Millen, White, Zelano & Branigan, P.C.; William Nixon (57) ABSTRACT

A modular missile launch system for launching missiles from a mobile platform includes a rectangular first support frame having a first longitudinal beam having a platform coupling structure formed for releasably fastening the first support frame to the mobile platform. A second longitudinal beam arranged at a distance from the first longitudinal beam includes a first connecting structure on an underside and a launch tube securing structure for mounting a missile launch tube to the first support frame. The first connecting structure defines a first plug connection portion extending in a longitudinal direction, onto which a second support frame with a second plug connection portion can be plugged in the vertical direction, having at least two first through bores that are spaced apart in the longitudinal direction, through each of which one connecting device can be passed in order to secure the first and the second support frame.

13 Claims, 8 Drawing Sheets

(56) References Cited

U.S. PATENT DOCUMENTS

| | | | |
|---|---|---|---|
| 2002/0189432 A1* | 12/2002 | Facciano | F41F 3/042 |
| | | | 89/1.801 |
| 2006/0081733 A1 | 4/2006 | Lam et al. | |
| 2006/0086241 A1* | 4/2006 | Miller | F41B 11/00 |
| | | | 89/1.802 |
| 2007/0006722 A1 | 1/2007 | Dekel | |
| 2010/0236391 A1 | 9/2010 | Baldi et al. | |
| 2019/0353453 A1* | 11/2019 | Bittner | F41F 3/042 |
| 2020/0200506 A1 | 6/2020 | Campbell et al. | |
| 2020/0386515 A1* | 12/2020 | Cantine | F41G 7/346 |

OTHER PUBLICATIONS

English Abstract for RU2539434, Publication Date: Jan. 20, 2015.
Search Report in corresponding EP 20 19 1478 dated Jan. 21, 2021 (pp. 1-2).

* cited by examiner

MODULAR MISSILE LAUNCH SYSTEM FOR LAUNCHING MISSILES FROM A MOBILE PLATFORM

The present invention relates to a modular missile launch system for launching missiles from a mobile platform such as an aircraft.

Launch systems are typically used to launch missiles or rockets from a mobile platform such as a helicopter, an airplane or, in general, an aircraft. Such launch systems generally comprise a carrier device which is coupled to the mobile platform and to which one or more launch tubes are fastened, from which the missiles are launched. Particularly, when such launch systems are intended for use on an aircraft, high demands are placed on the inertia and vibration behavior and the mass. In particular, it is desirable that the launch system also meets a predefined vibration requirement after one or more missiles have already been launched and the mass of the system thus changes.

To meet these requirements, missile launch systems are usually designed and constructed specifically for a particular mobile platform with a fixed number of launch tubes typically being provided. U.S. Pat. No. 3,766,828 A describes a modular launch system which comprises an upper launch module with a first carrier device for holding two launch tubes and a lower launch module with a second carrier device to hold two more launch tubes. The lower carrier module and the upper carrier module can be coupled to one another via eyelets.

It is the object of the present invention to provide an improved modular launch system.

This object is achieved by a system with the features of claim 1.

According to the invention, a modular missile launch system for launching missiles from a mobile platform with a rectangular first support frame is provided. The first support frame comprises a first longitudinal beam extending in a longitudinal direction, on which at least one platform coupling structure is formed for releasably fastening the first support frame to the mobile platform, and a second longitudinal beam extending along the longitudinal direction, which is arranged at a distance from the first longitudinal beam in a vertical direction that extends transversely to the longitudinal direction and comprises a first connecting structure on an underside that is oriented away from the first longitudinal beam. The first connecting structure defines a first plug connection portion extending in the longitudinal direction, onto which a second support frame with a second plug connection portion that is complementary to the first plug connection portion can be plugged in the vertical direction, and comprises at least two first through bores that are spaced apart in the longitudinal direction, through each of which one connecting device can be passed in order to secure the first and the second support frame to one another when the second support frame is plugged onto the first support frame. The first support frame also comprises at least one launch tube securing structure for mounting a missile launch tube to the first support frame.

One idea on which the invention is based is to provide a connecting structure on a support frame that extends in a longitudinal direction and to which a missile launch tube can be secured, which connecting structure makes it possible to plug the support frame into a further support frame. For this purpose, the connecting structure on an underside or a lower end of the first support frame is designed as a plug extending in the longitudinal direction or as a socket extending in the longitudinal direction. In general, the connecting structure of the first support frame thus defines a first plug connection portion. A further, second support frame, which comprises on its upper side a second connecting structure with a second plug connection portion that is complementary to the first plug connection portion, can thus be plugged onto the first plug connection portion of the first support frame in the vertical direction. According to the invention, the connecting structure comprises at least two first through bores that are spaced apart in the longitudinal direction. These can extend, for example, through the first plug connection portion so that a bolt, a screw, a rivet or generally a connecting device can be passed through the first through bores and through bores correspondingly formed on the second connecting structure of the second support frame in order to secure the first and the second support frame to one another.

One advantage of the launch system is that the elongated design of the first plug connection portion, with respect to a transverse direction extending transversely to the vertical direction and the longitudinal direction, provides a form-fitting securing option for a further support frame. Due to the elongated design, the force transmitted between the first support frame and a second support frame plugged onto the first frame is advantageously distributed along the longitudinal direction. As a result, a very rigid frame arrangement comprising the first and an optional second support frame can be formed.

Advantageous configurations and developments result from the subclaims referring back to the independent claims in conjunction with the description.

The first support frame can furthermore comprise a first connecting beam, which connects the first and second longitudinal beams, and a second connecting beam, which is spaced apart from the first longitudinal beam with respect to the longitudinal direction and which connects the first and the second longitudinal beam. A rectangular, closed frame is thus formed which, depending on its weight, has a high mechanical rigidity. The connecting beams can extend, for example, substantially perpendicularly or generally transversely to the longitudinal beams.

According to one embodiment of the launch system, the first plug connection portion can be formed by a recess formed on the underside of the second longitudinal beam or by a tab arrangement protruding from the underside of the second longitudinal beam in the vertical direction. For example, the second longitudinal beam can be designed as a hollow profile that is open on the underside having two opposing profile side walls extending in the longitudinal direction, with the profile side walls defining the longitudinally extending recess that forms the first plug connection portion. The first through holes can be formed, in particular, in the profile side walls and/or in a profile ceiling wall connecting the profile side walls. This simplifies the weight and the structural design of the plug connection device. The tab arrangement can, for example, comprise a tab which extends continuously in the longitudinal direction and which protrudes from the underside of the second longitudinal beam. The tab arrangement can, for example, have two tabs spaced apart in the transverse direction. It is conceivable, for example, that these are formed by the profile side walls. It is also conceivable that the tab arrangement comprises a plurality of tabs, generally at least two, spaced apart in the longitudinal direction, as a result of which the weight of the tab arrangement is advantageously further reduced.

According to a further embodiment, the first plug connection portion can extend, with respect to the longitudinal direction, over at least 80 percent of a length of the second longitudinal beam. In particular, the first plug connection portion can extend, with respect to the longitudinal direction, over at least 90 percent, preferably over at least 95 percent of a length of the second longitudinal beam. This way, the distribution of the force transmission between the first and second support frame is advantageously distributed further along the longitudinal direction.

According to a further embodiment, the first support frame can comprise at least one first transverse beam extending transversely to the longitudinal beams. The at least one transverse beam extends along the transverse direction. For example, the at least one transverse beam can comprise a first transverse beam portion which extends along a first side of the longitudinal beams with respect to the transverse direction and a second transverse beam portion which extends along a second side of the longitudinal beams with respect to the transverse direction. In general, at least one transverse beam is provided. For example, the first support frame can comprise a front transverse beam and a rear transverse beam arranged at a distance from the front transverse beam with respect to the longitudinal direction. The at least one transverse beam advantageously provides an additional mounting surface.

According to one embodiment, at least one launch tube securing structure of the first support frame can be formed on the first transverse beam. The launch tube securing structure can be designed, for example, as a recess on the transverse beam into which a fastening device for fastening the launch tube can be inserted. Alternatively or additionally, launch tube securing structures can be formed or provided on the first and/or the second longitudinal beam and/or on the first and/or the second optional connecting beam.

According to a further embodiment, the at least one first transverse beam can be integrally formed with one of the beams from the group consisting of the first longitudinal beam, the second longitudinal beam, a first connecting beam connecting the first and the second longitudinal beams, and a second connecting beam connecting the first and the second longitudinal beams. This advantageously improves the force transmission between the transverse beam and the other beams of the support frame.

According to a further embodiment, the at least one first transverse beam can be arranged in the region of the first longitudinal beam with respect to the vertical direction. The transverse beam is thus arranged very close to the platform coupling structure formed on the first longitudinal beam with respect to the vertical direction. This advantageously reduces a force application distance for applying a force from the transverse beam into the platform coupling structure. Furthermore, the strength of the transverse beam against fatigue caused by the vibrations of the transverse beam is improved.

According to a further embodiment, the first support frame can additionally comprise at least one reinforcement strut which extends between two beams from the group consisting of the first longitudinal beam, the second longitudinal beam, a first connecting beam connecting the first and the second longitudinal beam, and a second connecting beam connecting the first and the second longitudinal beam. This advantageously improves the torsional rigidity of the support frame with respect to the longitudinal direction. The reinforcement strut can be provided as a hollow profile, for example. This advantageously provides additional mounting space in which, for example, an electronic control device can be accommodated.

According to a further embodiment, the launch system can comprise at least one launch tube which can be or is connected to the at least one launch tube securing structure of the first support frame. For example, the launch tube can be a tube which extends in the longitudinal direction and which is arranged on the first side or on the second side of the first support frame with respect to the transverse direction. In particular, two launch tubes can be arranged on the first support frame, with a first launch tube being arranged on the first side of the first support frame with respect to the transverse direction and a second launch tube being arranged on the second side of the first support frame with respect to the transverse direction.

According to a further embodiment, the launch system can additionally comprise at least two connecting devices and a rectangular second support frame. The second support frame comprises a third longitudinal beam extending in a longitudinal direction, which comprises a second connecting structure on an upper side, with the second connecting structure defining a second plug connection portion which extends in the longitudinal direction and is complementary to the first plug connection portion and which can be plugged onto the first plug connection portion of the first support frame in the vertical direction, and comprises at least two second through bores arranged such that they correspond with the first through bores in the longitudinal direction. The connecting devices can each be passed through the first and the second through bores in order to secure the first and the second support frame to one another when the second support frame is plugged onto the first support frame. Furthermore, the second support frame also comprises at least one launch tube securing structure for mounting a missile launch tube to the second support frame. The second support frame is thus constructed substantially the same as the first support frame and comprises a second plug connection portion on an upper side of its longitudinal beam, which portion can be plugged onto the first plug connection portion. The second plug connection portion is complementary to the first plug connection portion. Consequently, the second plug connection portion is designed as a plug if the first plug connection portion is designed as a socket and as a socket if the first plug connection portion is designed as a plug. When the second support frame is plugged onto the first plug connection portion with its second plug connection portion, the through holes of both plug connection portions are aligned and the connecting devices, for example bolts, screws, rivets or the like, can be inserted into the through holes. As already described above, a structurally simple, vibration-proof and mechanically very robust connection is thus provided between the support frames. Due to the detachable coupling of the first and the second support frame to one another, the launch system can also be flexibly converted, for example in order to change the loading of the system with launch tubes.

The second support frame can optionally comprise a fourth longitudinal beam, which is arranged at a distance from the third longitudinal beam in the vertical direction. Furthermore, the second support frame can comprise a third connecting beam, which connects the third and the fourth longitudinal beams, and a fourth connecting beam, which is arranged at a distance from the third longitudinal beam with respect to the longitudinal direction and which connects the third and fourth longitudinal beams. A rectangular, closed frame is thus formed which, depending on its weight, has a high mechanical rigidity. The connecting beams can extend, for example, substantially perpendicularly or generally transversely to the longitudinal beams. Alternatively or additionally, the second support frame can also comprise at least one second transverse beam, as was described above for the first support frame. For example, at least one launch tube securing structure of the second support frame can be formed on the second transverse beam. The at least one second transverse beam can, for example, be formed integrally with the third or fourth longitudinal beam. Furthermore, the at least one second transverse beam can be arranged, for example, in the region of the third longitudinal beam with respect to the vertical direction.

According to one embodiment, the second plug connection portion can be formed by a tab arrangement protruding in the vertical direction from the upper side of the third longitudinal beam or by a recess formed on the upper side of the third longitudinal beam. For example, the third longitudinal beam can be designed as a hollow profile open at the upper side with two opposing profile side walls which extend in the longitudinal direction with the profile side walls defining the longitudinally extending recess that forms the second plug connection portion. The second through holes can, in this case, be formed, in particular, in the profile side walls and/or in a profile bottom wall connecting the profile side walls. This simplifies the weight and the structural design of the plug connection device. The tab arrangement can, for example, comprise a tab which extends continuously in the longitudinal direction and which protrudes from the underside of the second longitudinal beam. The tab arrangement can, for example, have two tabs spaced apart in the transverse direction. It is conceivable, for example, that these are formed by the profile side walls. It is also conceivable that the tab arrangement comprises a plurality of tabs, generally at least two, spaced apart in the longitudinal direction, as a result of which the weight of the tab arrangement is advantageously further reduced.

According to a further embodiment, the second plug connection portion can extend over at least 80 percent, in particular over at least 90 percent and particularly preferably over at least 95 percent of a length of the third longitudinal beam with respect to the longitudinal direction. The first and the second plug connection portion are advantageously of the same length. As a result of the extension over at least 80 percent or more of the length of the third longitudinal profile, the distribution of the force transmission between the first and the second support frame is advantageously distributed further along the longitudinal direction.

According to a further embodiment, the through bores each extend in a transverse direction extending transversely to the vertical direction and to the longitudinal direction. That means that the first through bores of the first connecting structure and the second through bores of the second connecting structure each extend in the transverse direction, as a result of which, when the first and second plug connection portions are plugged into one another, the connecting devices can easily be inserted into the through bores that are easily accessible from the side of the support frame.

With regard to directional information and axes, in particular directional information and axes that relate to the course of physical structures, a course of an axis, a direction or a structure "along" another axis, direction or structure means here that these, and in particular the tangents resulting at a particular point of the structures, each have an angle of less than or equal to 45 degrees, preferably less than 30 degrees and particularly preferably parallel to one another.

With regard to directional information and axes, in particular directional information and axes that relate to the course of physical structures, a course of an axis, a direction or a structure being "transverse" to another axis, direction or structure means here that these, and in particular the tangents resulting at a particular point of the structures, each have an angle of greater than or equal to 45 degrees, preferably greater than 60 degrees and particularly preferably vertical to one another.

In this context, components formed as "one-part," "one-piece," "integrally" or "in one piece" are generally understood to mean that these components are present as a single part forming a unit of material and, in particular, are produced as such, and one component is not detachable from the other without breaking the material cohesion.

BRIEF DESCRIPTION OF THE DRAWINGS

The invention is explained below with reference to the figures of the drawings. The figures show the following.

In the figures, the same reference symbols denote the same or functionally identical components unless stated otherwise.

Figure 1:
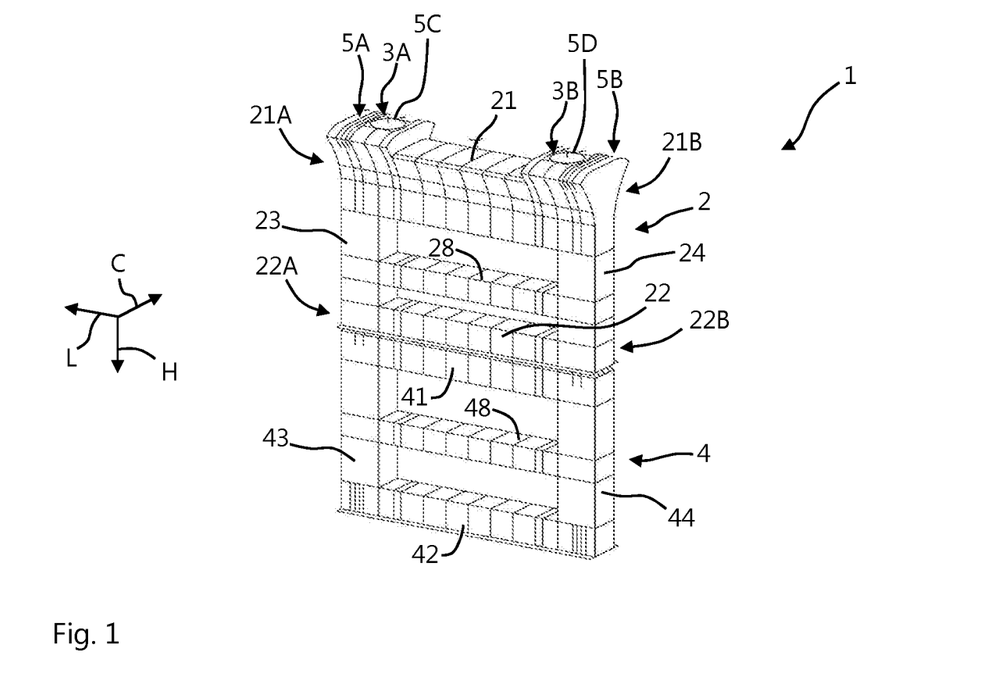
FIG. 1 shows a perspective view of a missile launch system according to an embodiment of the invention, wherein the missile launch system is shown in a state in which a first and a second support frame are plugged onto one another.
Figure 17:
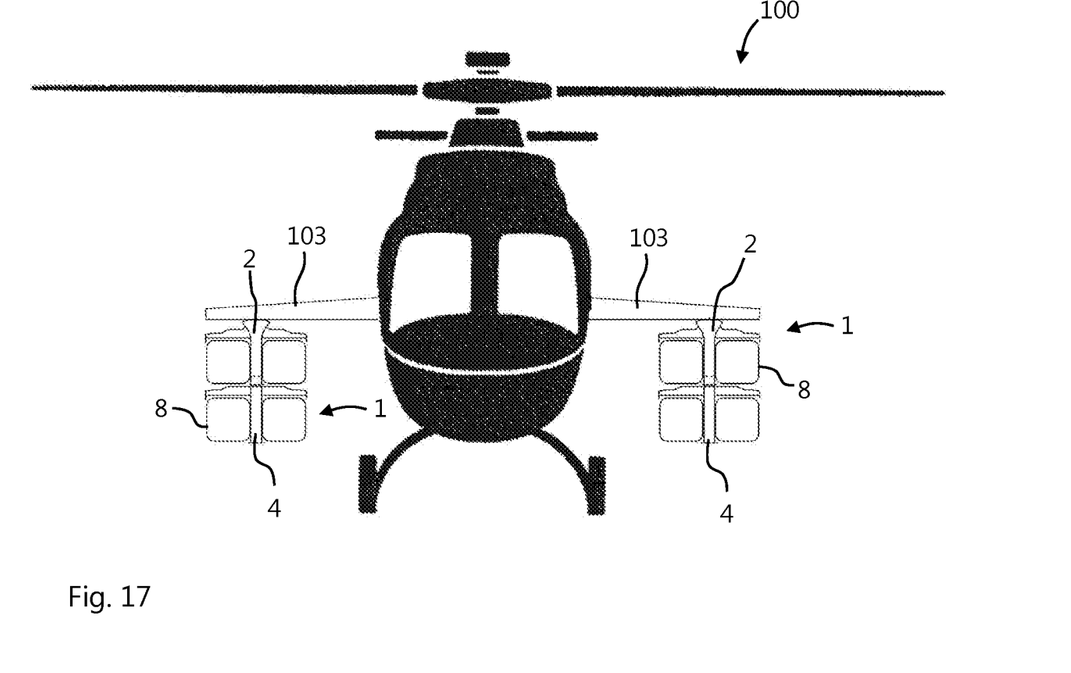
FIG. 17 shows a schematic view of an aircraft with a missile launch system according to a further embodiment of the invention.

FIG. 1 shows, by way of example, a modular missile launch system 1 for launching missiles from a mobile platform 100. FIG. 17 shows, purely by way of example, a mobile platform 100 designed as a helicopter. The missile launch system 1 can be fastened to the mobile platform 100 and is used to launch missiles (not shown), such as guided missiles, ballistic missiles or the like, from the mobile platform 100.

Figure 2:
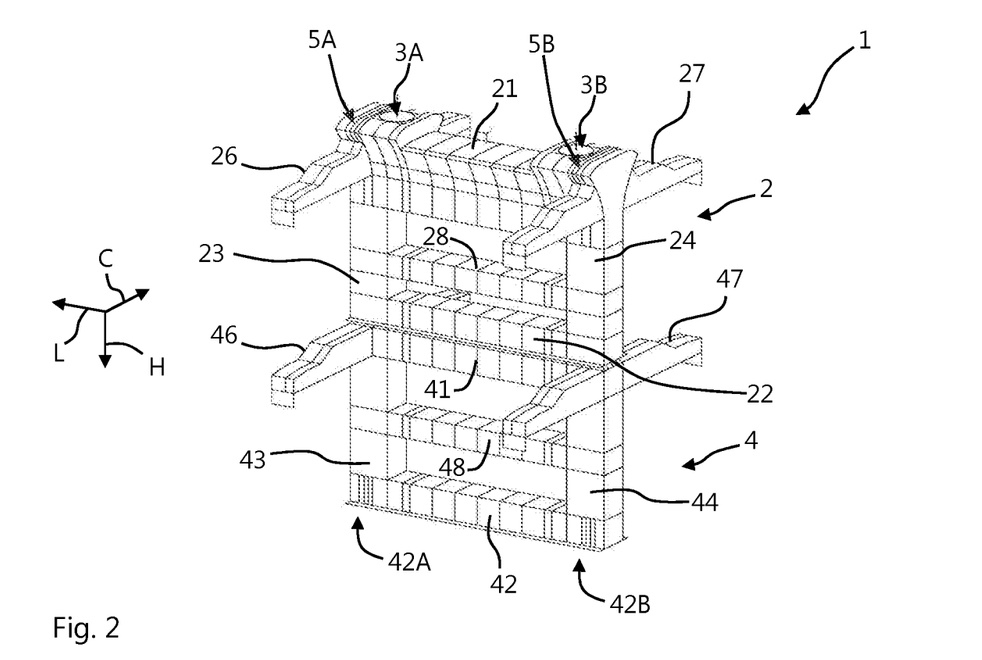
FIG. 2 shows a perspective view of a further missile launch system according to an embodiment of the invention, wherein the missile launch system is shown in a state in which a first and a second support frame are plugged onto one another.
Figure 3:
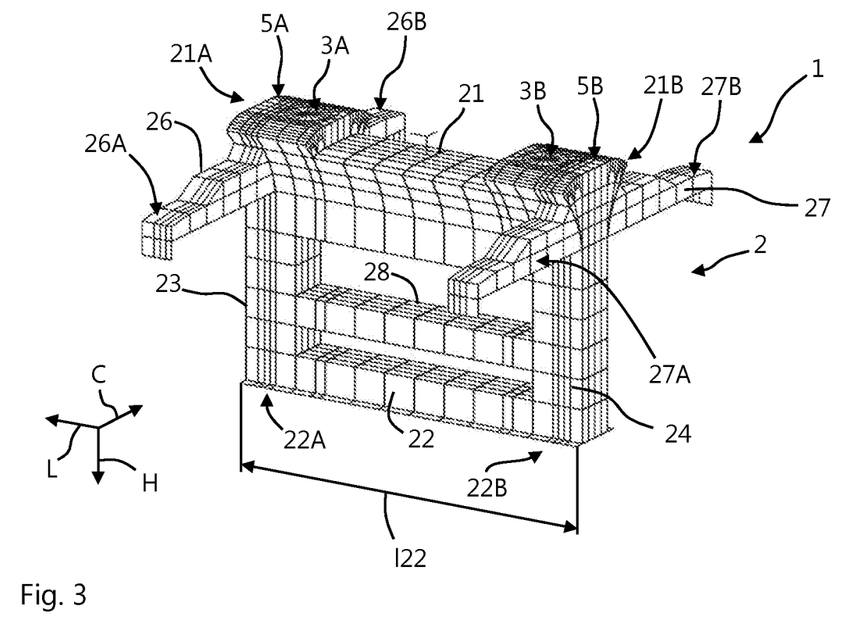
FIG. 3 shows a perspective view of a missile launch system according to an embodiment of the invention.

The system 1 shown by way of example in FIG. 1 comprises a first support frame 2 and an optional second support frame 4, each of which is rectangular. FIG. 2 shows a further missile launch system 1 by way of example, which likewise comprises a first support frame 2 and an optional second support frame 4. The system 1 shown by way of example in FIG. 2 differs from the system 1 shown in FIG. 1, in particular in that the first and the optional second support frames 2, 4 each have transverse beams 26, 27, 46, 47, as will be explained in more detail below. FIG. 3 shows a system 1 with only a first support frame 2 by way of example. This support frame can also be used in combination with the system 1 according to FIG. 2.

As shown, in particular, in FIGS. 1 to 3 and 7, the first support frame 2 can comprise a first longitudinal beam 21 extending in or along a longitudinal direction L, a second longitudinal beam 22 extending in or along the longitudinal direction L with said beam being arranged such that it is arranged at a distance from the first longitudinal beam 21 in a vertical direction H that extends transversely to the longitudinal direction L, a first connecting beam 23 which extends between the first and the second longitudinal beam 21, 22, and a second connecting beam 24 which extends between the first and the second longitudinal beam 21, 22 and is arranged in the longitudinal direction L at a distance from the first connecting beam 23. As shown, in particular, in FIGS. 1 to 3 and 7 by way of example, the first connecting beam 23 can extend between a first end portion 21A of the first longitudinal beam 21 and a first end portion 22A of the second longitudinal beam 22, and the second connecting beam 24 can extend between a second end portion 21B of the first longitudinal beam 21 which is located opposite the first end portion 21A with respect to the longitudinal direction L and a second end portion 22B of the second longitudinal beam 22 which is located opposite the first end portion 22A with respect to the longitudinal direction L. It is also conceivable that the end portions 21A, 21B of the first longitudinal beam 21 protrude beyond the first connecting beam 23 and/or beyond the second connecting beam 24 with respect to the longitudinal direction L. Of course, it is also conceivable that the end portions 22A, 22B of the second longitudinal beam 22 protrude beyond the first connecting beam 23 and/or beyond the second connecting beam 24 with respect to the longitudinal direction L.

As shown, in particular, in FIGS. 1 and 2, a first platform coupling structure 3A and a second platform coupling structure 3B are formed on the first longitudinal beam 21. In general, at least one platform coupling structure 3A, 3B is provided on the first longitudinal beam 21. The platform coupling structure 3A, 3B is used to detachably fasten the first support frame 2 to the mobile platform 100. As shown in FIGS. 1 and 2, the first and the second platform coupling structure 3A, 3B can each be formed in the end portions 21A, 21B of the first longitudinal beam 21. The first longitudinal beam 21 can comprise regions 5A, 5B on an upper side that protrude in the vertical direction H in the end portions 21A, 21B. These protruding regions 5A, 5B can each comprise a recess 5C, 5D in which a platform coupling structure 3A, 3B, for example designed as a tab (not shown), is arranged. The at least one platform coupling structure 3A, 3B can be designed, for example, in accordance with the MIL-STD-8591 standard.

As is also shown by way of example in FIGS. 1 to 3 and 7, the first support frame 2 can furthermore comprise at least one optional reinforcement strut 28. FIGS. 1 to 3 and 7 show purely by way of example that a reinforcement strut 28 is provided, which extends between the first and the second connecting beam 23, 24. In general, the at least one reinforcement strut 28 extends between two beams from the group consisting of the first longitudinal beam 21, the second longitudinal beam 22, the first connecting beam 23 and the second connecting beam 24.

The longitudinal beams 21, 22, the connecting beams 23, 24 and the reinforcement strut 28 of the first support frame 2 can, for example, be welded to one another, machined from a solid material, formed in an additive manufacturing process or integrally manufactured in another way. Of course, the longitudinal beams 21, 22, the connecting beams 23, 24 and the reinforcement strut 28 of the first support frame 2 can also be screwed, riveted or connected to one another in some other way.

As is also shown by way of example in FIGS. 2 to 4 and 7, the first support frame 2 can comprise at least one first transverse beam 26. FIGS. 2 to 4 and 7 show purely by way of example that the first support frame 2 comprises a first front transverse beam 26 with respect to the longitudinal direction L and a first rear transverse beam 27 with respect to the longitudinal direction L, which is arranged at a distance from the first front transverse beam 26 in the longitudinal direction L. FIGS. 2 to 4 and 7 also show by way of example that the first front transverse beam 26 is arranged in the first end portion 21A of the first longitudinal beam 21, and the first rear first transverse beam 27 is arranged in the second end portion 22A of the first longitudinal beam 21. As is also shown purely by way of example in FIGS. 2 to 4 and 7, the at least one first transverse beam 26, 27 can be arranged in the region of the first longitudinal beam 21 with respect to the vertical direction H. Regardless of the arrangement of the transverse beams 26, 27, it is also conceivable that the first longitudinal beam 21 protrudes with its end portions 21A, 21B over the first connecting beam 23 and/or over the second connecting beam 24 with respect to the longitudinal direction L. In this case, the transverse beams 26, 27 can also be arranged in the end portions 21A, 21B of the first longitudinal beam 21 projecting beyond the particular connecting beam 23, 24. In the same way, the transverse beams 26, 27 can also be arranged in end portions 22A, 22B of the second longitudinal beam 22 that protrude beyond the particular connecting beam 23, 24.

Figure 4:
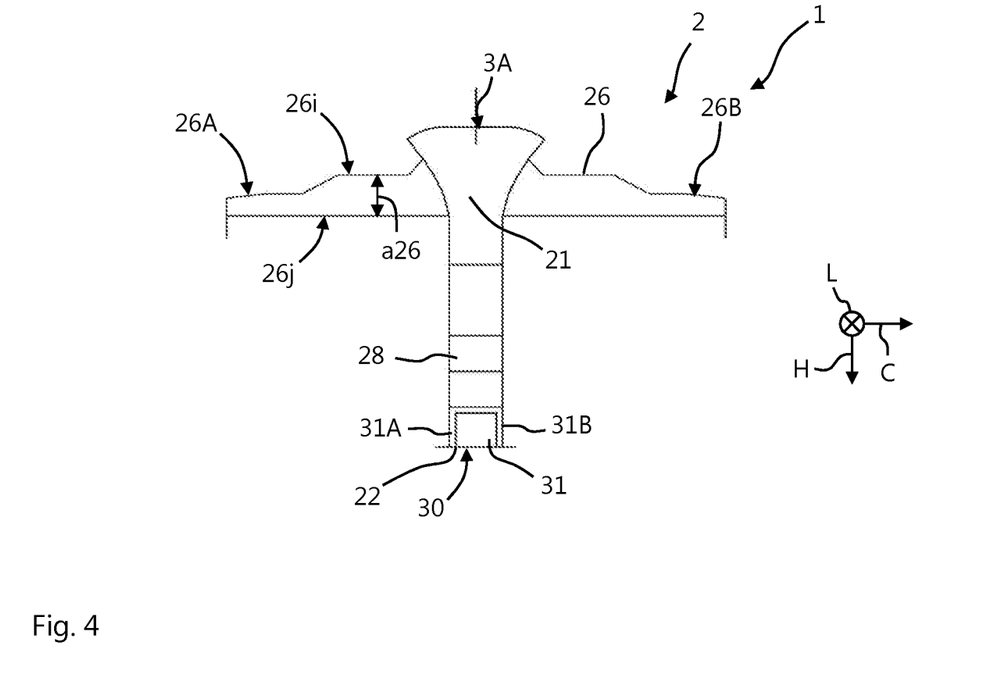
FIG. 4 shows a sectional view of the system shown in FIG. 3.

As can be seen, in particular, in FIG. 4, the at least one first transverse beam 26, 27 extends transversely to the longitudinal beams 21, 22 or in a transverse direction C, which extends transversely to the longitudinal direction L and transversely to the vertical direction H. The transverse beams 26, 27 can, in particular, each comprise a first transverse beam portion 26A, 27A which extends, with respect to the transverse direction C, on a first side of the longitudinal beams 21, 22, and a second transverse beam portion 26B, 27B which extends, with respect to the transverse direction C, on a second side of the longitudinal beams 21, 22, as shown by way of example in FIGS. 2 to 4 and 7. The first transverse beam portion 26A, 27A and the second transverse beam portion 26B, 27B can each extend symmetrically with respect to the longitudinal beams 21, 22 or the transverse direction C, respectively. As shown purely by way of example in FIG. 4, the first transverse beam portion 26A, 27A and the second transverse beam portion 26B, 27B can each have a cross-sectional shape that is stepped along the transverse direction C. Here, each transverse beam portion 26A, 27A, 26B, 27B can have a planar surface 26j, which is lower with respect to the vertical direction H, and an upper surface 26i, which extends stepwise with respect to the vertical direction H, with a distance a26 between the upper surface 26i and the lower surface 26j gradually decreasing as the distance from the longitudinal beams 21, 22 increases, as shown by way of example in FIG. 4.

The at least one first transverse beam 26, 27 can, in particular, be formed in one piece with the first longitudinal beam 21, as schematically shown in FIGS. 3 and 4. The transverse beam portions 26A, 26B, 27A, 27B can be welded to the longitudinal beam 21, for example. In general, the at least one first transverse beam 26, 27 can be formed in one piece with one of the beams from the group consisting of the first longitudinal beam 21, the second longitudinal beam 22, the first connecting beam 23, and the second connecting beam 24. Alternatively, the at least one first transverse beam 26, 27 can be screwed, riveted or otherwise connected to one of the beams from the group consisting of the first longitudinal beam 21, the second longitudinal beam 22, the first connecting beam 23, and the second connecting beam 24.

Figures 12, 13:
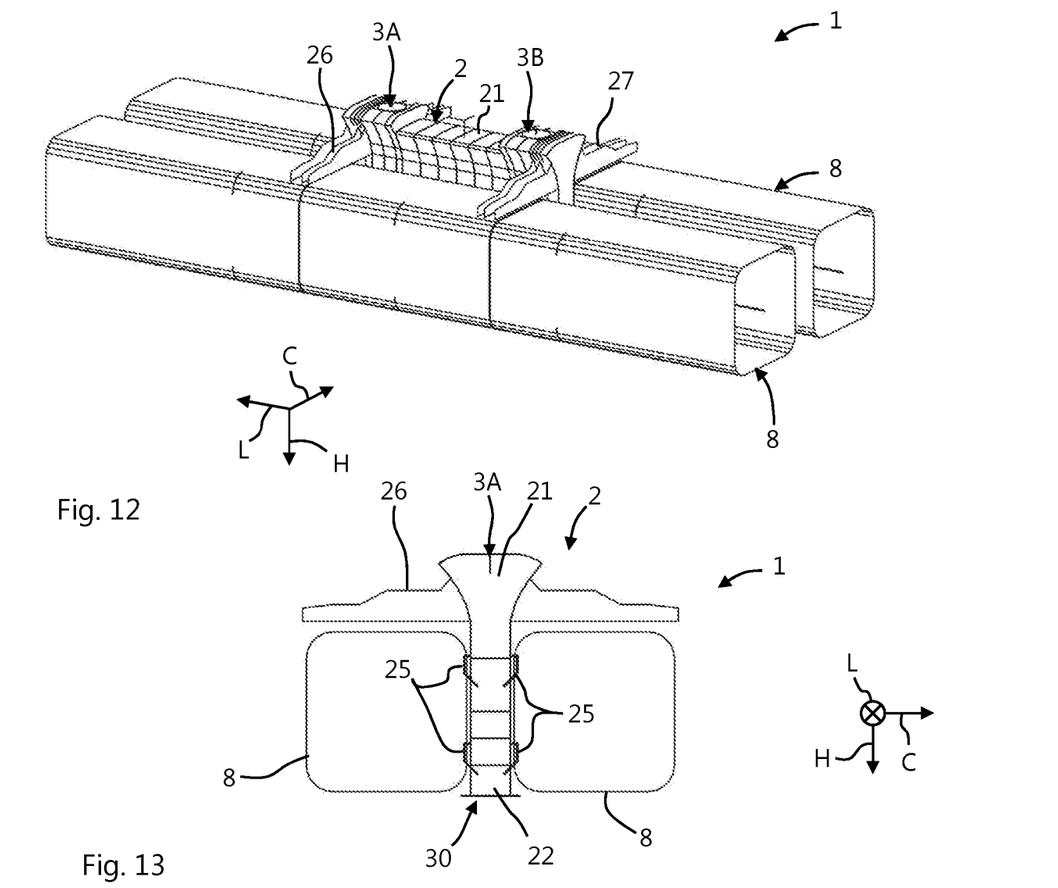
FIG. 12 shows a perspective view of a missile launch system according to a further embodiment of the invention.
FIG. 13 shows a sectional view of a missile launch system according to a further embodiment of the invention.
Figure 14:
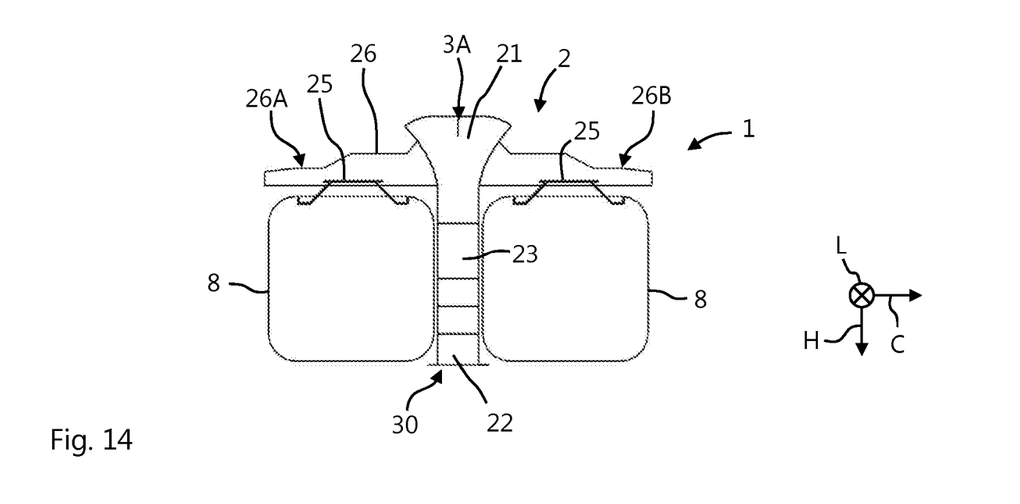
FIG. 14 shows a sectional view of a missile launch system according to a further embodiment of the invention.
Figure 15:
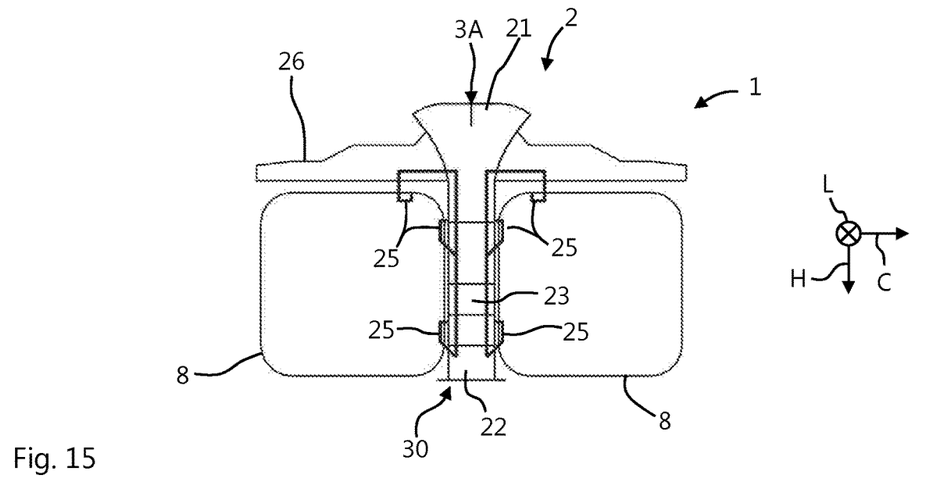
FIG. 15 shows a sectional view of a missile launch system according to a further embodiment of the invention.

The first support frame 2 also comprises at least one launch tube securing structure 25, which is used to mount a missile launch tube 8 to the first support frame 2. In general, one or more launch tube securing structures 25 can be provided on one or more of the beams from the group consisting of the first longitudinal beam 21, the second longitudinal beam 22, the first connecting beam 23, and the second connecting beam 24. FIG. 13 shows by way of example that two launch tube securing structures 25 spaced apart in the vertical direction H are formed on each launch tube 8 on the first connecting beam 23. FIG. 14 shows by way of example that a launch tube securing structure 25 is formed in each case on the front first transverse beam 26 on the two transverse beam portions 26A, 26B. FIG. 15 shows by way of example that on the first front transverse beam 26 on the two transverse beam portions 26A, 26B a launch tube securing structure 25 is provided and, on the first connecting beam 23, launch tube securing structures 25 are provided. The launch tube securing structures 25 can be designed, for example, as recesses into which a fastening device, for example in the form of a screw, can be screwed to fasten the launch tube 8. The launch tube securing structures 25 can also be designed as grooves, brackets or the like, to which a securing structure provided on the particular launch tube 8 can be connected in a form-fitting manner.

The optional second support frame 4 can substantially be constructed in the same way as the first support frame 2. As is shown by way of example in FIGS. 1, 2, 5 and 7, the second support frame 4 can comprise a third longitudinal beam 41 extending in the longitudinal direction L and a fourth longitudinal beam 42 which is arranged at a distance from the third longitudinal beam 41 in the vertical direction H. Furthermore, the second support frame 4 can comprise a third connecting beam 42, which connects the third and fourth longitudinal beams 41, 42, and a fourth connecting beam 44, which is arranged at a distance from the third longitudinal beam 43 with respect to the longitudinal direction L and which connects the third and fourth longitudinal beams 41, 42. As shown, in particular, in FIGS. 1, 2, 5 and 7 by way of example, the third connecting beam 43 can extend between a first end portion 41A of the third longitudinal beam 41 and a first end portion 42A of the fourth longitudinal beam 42, and the fourth connecting beam 44 can extend between a second end portion 41B of the third longitudinal beam 41, which is located opposite the first end portion 41A with respect to the longitudinal direction L and a second end portion 42B of the fourth longitudinal beam 42, which is located opposite the first end portion 42A with respect to the longitudinal direction L. It is also conceivable that the end portions 41A, 41B of the third longitudinal beam 41 protrude beyond the third connecting beam 43 and/or beyond the fourth connecting beam 44 with respect to the longitudinal direction L. Of course, it is also conceivable that the end portions 42A, 42B of the fourth longitudinal beam 42 protrude beyond the third connecting beam 43 and/or beyond the fourth connecting beam 44 with respect to the longitudinal direction L. In the same way, the transverse beams 46, 47 can also be arranged in end portions 42A, 42B of the fourth longitudinal beam 42 that protrude beyond the particular connecting beam 43, 44.

As is also shown by way of example in FIGS. 1, 2, 5 and 7, the second support frame 4 can comprise at least one optional reinforcement strut 48. FIGS. 1, 2, 5 and 7 show purely by way of example that a reinforcement strut 48 which extends between the third and fourth connecting beams 43, 44 is provided. In general, the at least one reinforcement strut 48 extends between two beams from the group consisting of the third longitudinal beam 41, the fourth longitudinal beam 42, the third connecting beam 43, and the fourth connecting beam 44.

The longitudinal beams 41, 42, the connecting beams 43, 44 and the reinforcement strut 48 of the second support frame 4 can, for example, be welded to one another, machined from a solid material, formed in an additive manufacturing process or manufactured in one piece in another way. Of course, the longitudinal beams 41, 42, the connecting beams 43, 44 and the reinforcement strut 48 of the second support frame 4 can also be screwed, riveted or connected to one another in some other way.

As is shown by way of example in FIGS. 2, 5, 6 and 7, the second support frame 4 can comprise at least one second transverse beam 46, 47. FIGS. 2, 5, 6 and 7 show purely by way of example that one of the second support frames 4 comprises a second front transverse beam 46 with respect to the longitudinal direction L and a second rear transverse beam 47 with respect to the longitudinal direction L, which is arranged such that it is arranged at a distance from the second front transverse beam 46 in the longitudinal direction L. FIGS. 2, 5, 6 and 7 also show by way of example that the second front transverse beam 46 is arranged in the first end portion 41A of the third longitudinal beam 41, and the rear second transverse beam 47 is arranged in the second end portion 42A of the third longitudinal beam 41. As is also shown purely by way of example in FIGS. 2, 5, 6 and 7, the at least one second transverse beam 46, 47 can be arranged in the region of the third longitudinal beam 41 with respect to the vertical direction H. Regardless of the arrangement of the transverse beams 46, 47, it is also conceivable that the end portions 41A, 41B of the third longitudinal beam 41 protrude beyond the third connecting beam 43 and/or the fourth connecting beam 44 with respect to the longitudinal direction L. In this case, the transverse beams 46, 47 can also be arranged in the end portions 41A, 41B of the third longitudinal beam 41 protruding beyond the particular connecting beam 43, 44.

Figure 5:
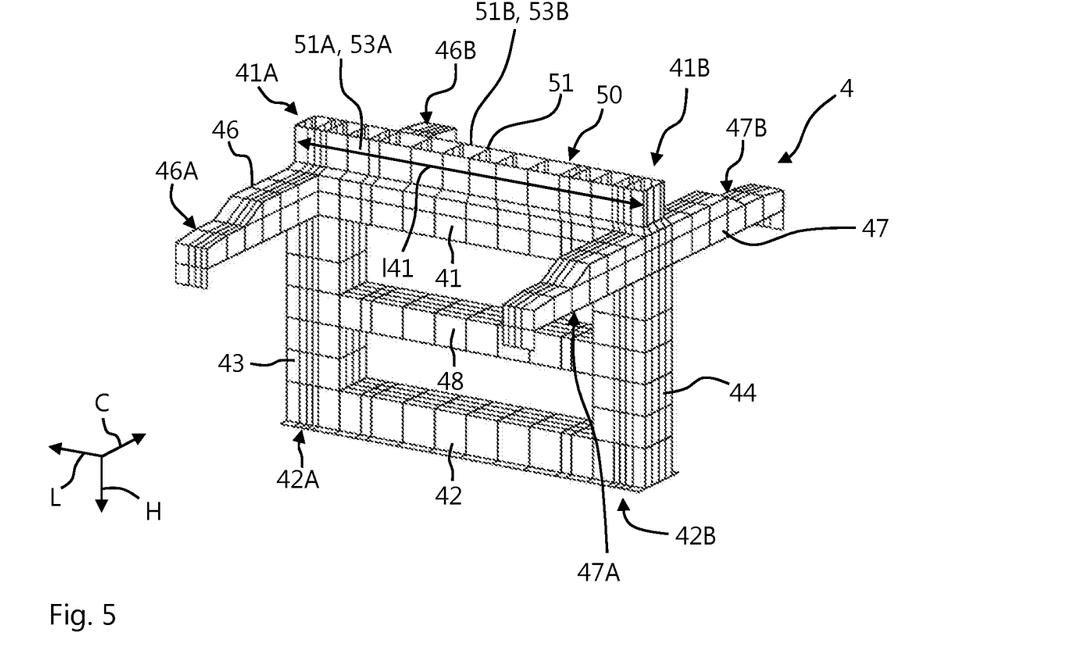
FIG. 5 shows a second support frame of a missile launch system according to an embodiment of the invention.
Figure 6:
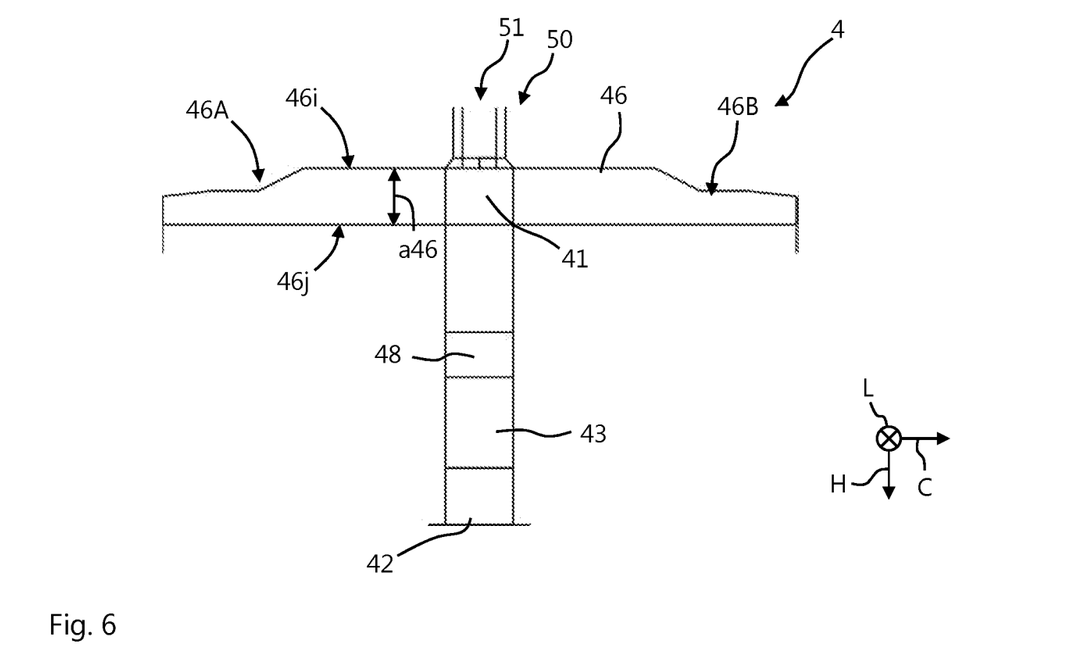
FIG. 6 shows a sectional view of the second support frame shown in FIG. 5.

As can be seen, in particular, in FIG. 6, the at least one second transverse beam 46, 47 extends transversely to the longitudinal beams 41, 42 or in the transverse direction C. The second transverse beams 46, 47 can, in particular, each have a first transverse beam portion 46A, 47A, which extends with respect to the transverse direction C on a first side of the longitudinal beams 41, 42, and a second transverse beam portion 46B, 47B, which extends with respect to the transverse direction C on a second side of the longitudinal beams 41, 42, as shown in FIGS. 2 and 5 to 7. The first transverse beam portion 46A, 47A and the second transverse beam portion 46B, 47B can each extend symmetrically with respect to the longitudinal beams 41, 42 or the transverse direction C, respectively. As shown purely by way of example in FIG. 6, the first transverse beam portion 26A, 27A and the second transverse beam portion 46B, 47B can each have a cross-sectional shape that is stepped along the transverse direction C. Here, each transverse beam portion 46A, 47A, 46B, 47B can have a planar surface 46$j$, which is lower with respect to the vertical direction H, and an upper surface 46$i$, which extends stepwise with respect to the vertical direction H, with a distance a46 between the upper surface 46$i$ and the lower surface 46$j$ gradually decreasing as the distance from the longitudinal beams 41, 42 increases, as is shown by way of example in FIG. 6.

The at least one second transverse beam 46, 47 can, in particular, be formed in one piece with the third longitudinal beam 41, as schematically shown in FIGS. 3 and 4. The transverse beam portions 46A, 46B, 47A, 47B, for example, can be welded to the longitudinal beam 41. In general, the at least one first transverse beam 46, 47 can be integrally formed with one of the beams from the group consisting of the third longitudinal beam 41, the fourth longitudinal beam 42, the third connecting beam 43, and the fourth connecting beam 44. Alternatively, the at least one second transverse beam 46, 47 can be screwed, riveted or otherwise connected to one of the beams from the group consisting of the third longitudinal beam 41, the fourth longitudinal beam 42, the third connecting beam 43, and the fourth connecting beam 44.

Figure 11:
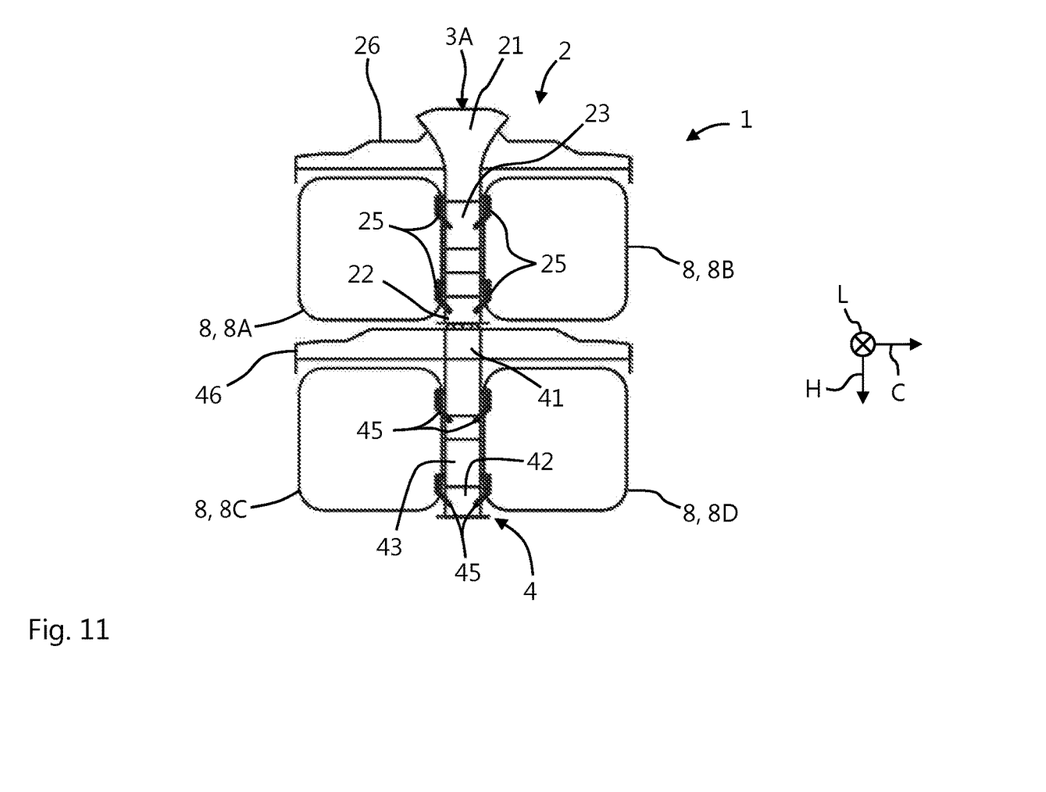
FIG. 11 shows a sectional view of a missile launch system according to a further embodiment of the invention.

The second support frame 4 can also comprise at least one launch tube securing structure 45, which is used to mount a missile launch tube 8 to the second support frame 4. FIG. 11 shows by way of example that two launch tube securing structures 45 per launch tube 8 can each be formed on the side of the third connecting beam 43. Of course, the launch tube securing structures 45 can also be used in the second support frame 4, as shown in FIGS. 13 to 15 for the first support frame 2 and explained in detail above.

The longitudinal beams 21, 22, 41, 42, the optional connecting beams 23, 24, 43, 44, the optional transverse beams 26, 27, 46, 47 and the optional reinforcement strut 28, 48 can each be designed as hollow profiles. The longitudinal beams 21, 22, 41, 42, the optional connecting beams 23, 24, 43, 44, the optional transverse beams 26, 27, 46, 47 and the optional reinforcement strut 28, 48 can each have a rectangular cross section, as shown in FIGS. 1 to 7 by way of example. Other cross-sectional shapes are likewise conceivable, of course. The longitudinal beams 21, 22, 41, 42, the optional connecting beams 23, 24, 43, 44, the optional transverse beams 26, 27, 46, 47 and the optional reinforcement strut 28, 48 can each be made of a metal material, for example an aluminum alloy, construction steel, a titanium alloy or a similar high-strength material.

Figure 7:
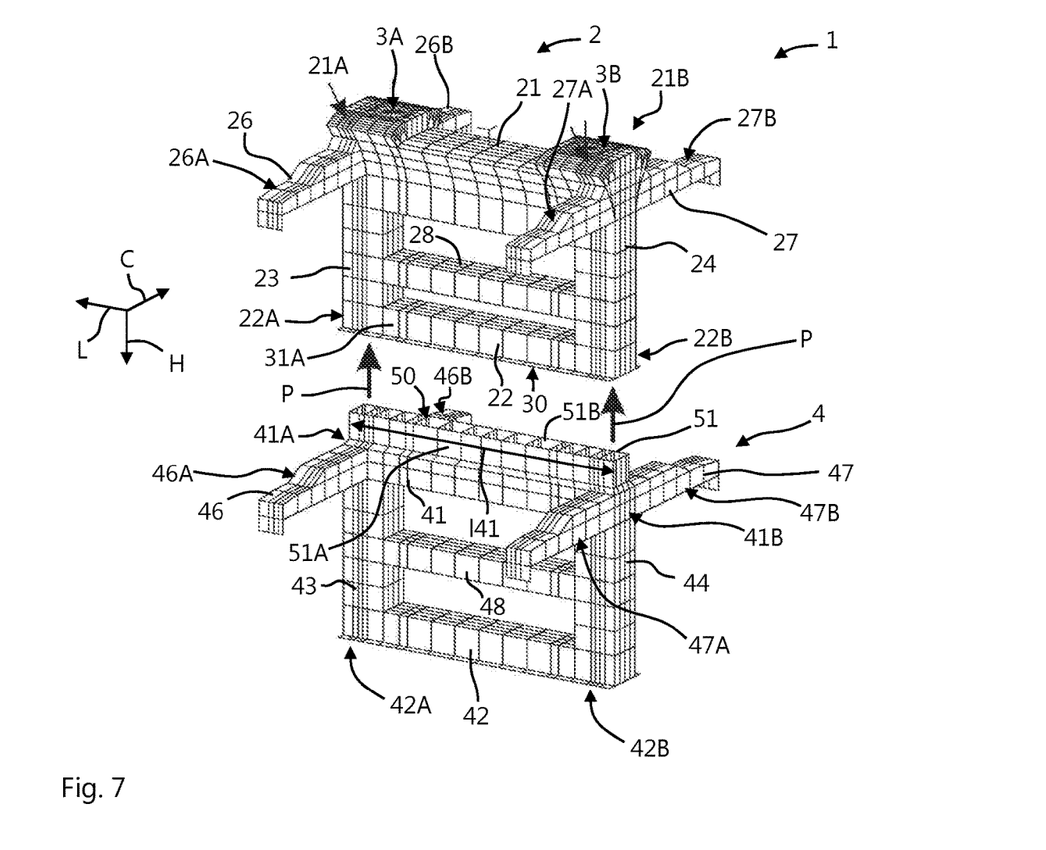
FIG. 7 shows an exploded perspective view of the system shown in FIG. 2.
Figure 8:
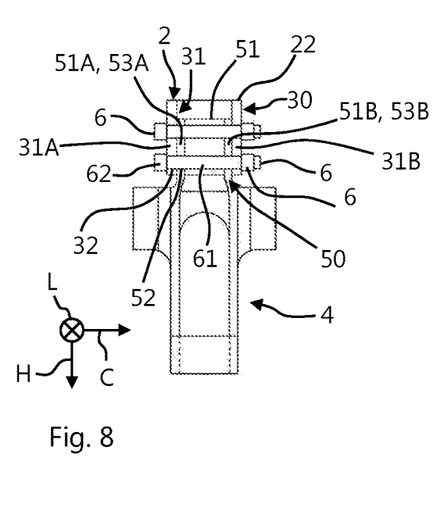
FIG. 8 shows a partial sectional view of a connection between a first support frame and a second support frame of a missile launch system according to an embodiment of the invention.
Figure 9:
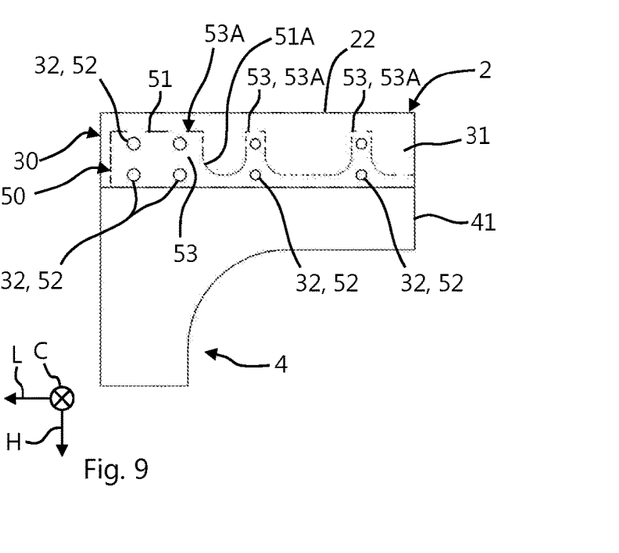
FIG. 9 shows a side view of the connection shown in FIG. 8.

As is shown by way of example in FIGS. 4, 8 and 9 in a purely schematic manner, the second longitudinal beam 22 of the first support frame 2 comprises a first connecting structure 30 on an underside that is oriented away from the first longitudinal beam 21 with respect to the vertical direction H. Corresponding to this, the third longitudinal beam 41 of the optional second support frame 4 comprises a second connecting structure 50 on an upper side, which is oriented with respect to the vertical direction H opposite to the optional fourth longitudinal beam 42, as shown by way of example and in a purely schematic manner in FIGS. 5 to 9. As shown in FIGS. 7 to 9, the first support frame 2 and the second support frame 4 can be connected to one another or fastened to one another by means of the first and second connecting structures 30, 50.

The first connecting structure 30 defines a first plug connection portion 31 extending in the longitudinal direction L, which is configured to establish a plug connection with a complementarily designed second plug connection portion 51 of the second connecting structure 50 of the second support frame 4. As is shown by way of example in FIGS. 4, 8 and 9, the first plug connection portion 31 can be designed, for example, as a recess extending in the longitudinal direction L and thus as a socket. As shown, in particular, in FIGS. 4 and 8 by way of example, the recess can be defined by profile side walls 31A, 31B of the second longitudinal beam 22 lying opposite one another in the transverse direction C. Alternatively, it is also conceivable that the first plug connection portion 31 is formed by a tab arrangement (not shown) protruding from the underside of the second longitudinal beam 22 in the vertical direction H, i.e., as a plug extending in the longitudinal direction L. The connecting structure 30 can thus be formed by an end portion of the first support frame 2, in particular the second longitudinal beam 22, which is lower with respect to the vertical direction H.

The first connecting structure 30 thus generally defines a first plug connection portion 31 extending in the longitudinal direction L. This portion can, for example, extend substantially over the entire length of the second longitudinal beam 22. In general, the first plug connection portion 31, for example the recess defined by the profile side walls 31A, 31B, can extend over at least 80 percent of a length l22 of the second longitudinal beam 22 with respect to the longitudinal direction L.

As shown in FIG. 9, the first connecting structure 30 comprises at least two first through bores 32 that are spaced apart in the longitudinal direction L. As is shown by way of example in FIGS. 8 and 9, the through bores 32 can be formed in the profile side walls 31A, 31B and penetrate them completely. In general, the through bores 32 can each extend in the transverse direction C. FIG. 9 shows by way of example that a plurality of first through bores 32 (four through bores are visible in FIG. 9) is provided along the longitudinal direction L. Optionally, a row of first through bores 32, which is lower with respect to the vertical direction H, and an upper row of first through bores 32 can be provided, which is arranged at a distance from the first row with respect to the vertical direction H, as shown by way of example in FIG. 9.

The second connecting structure 50 also defines a second plug connection portion 51, which extends in the longitudinal direction L and which is complementary to the first plug connection portion 31, so that it can be plugged onto the first plug connection portion 31 of the first support frame 2 in the vertical direction H, as symbolically indicated in FIG. 7 by the arrows P. As is shown by way of example in FIGS. 5, 6, 8 and 9, the second plug connection portion 51 can be designed, for example, as a tab arrangement extending in the longitudinal direction L and thus as a plug. FIG. 5 shows by way of example that the tab arrangement can be formed by two walls 51A, 51B which lie opposite one another with respect to the transverse direction and which extend continuously in the longitudinal direction L between the first and the second end portion 41A, 41B of the third longitudinal profile 41 and protrude in the vertical direction H from the upper side of the third longitudinal profile 41. The walls 51A, 52A here form tab profiles 53A, 53B which lie opposite one another with respect to the transverse direction. FIG. 9 shows by way of example a tab arrangement which comprises a plurality of tab portions 53 which are spaced apart from one another with respect to the longitudinal direction L and which each protrude from the upper side of the third longitudinal profile 41 in the vertical direction H. The tab portions 53 together form a tab profile 53A. As is shown by way of example in FIG. 8, the tab arrangement can generally have two tab profiles 53A, 53B that are located opposite one another and spaced apart in the transverse direction C. Alternatively, it is also conceivable that the second plug connection portion 51 is formed by a recess (not shown) that is formed on the upper side of the third longitudinal beam 41 and that extends in the longitudinal direction L, i.e., that is formed as a socket. The second connecting structure 50 can thus be formed by an upper end portion of the second support frame 4, in particular the third longitudinal beam 42, with respect to the vertical direction H.

The second connecting structure 50 thus generally defines a second plug connection portion 51 extending in the longitudinal direction L. This portion can, for example, extend substantially over the entire length of the third longitudinal beam 41. In general, the second plug connection portion 51, i.e., for example, the tab arrangement defined by the profile side walls 51A, 51B or the tab profiles 53A, 53B, can extend with respect to the longitudinal direction L over at least 80 percent of a length l41 of the third longitudinal beam 41.

As is shown by way of example in FIG. 9, the second connecting structure 50 comprises at least two second through bores 52 that are spaced apart in the longitudinal direction L. The second through bores 52 are arranged such that they correspond with the first through bores 32 of the first connecting structure 30. That means that when the first and the second plug profile portions 31, 51 are inserted into one another, as shown in FIGS. 8 and 9 by way of example, the first and second through bores 32, 52 are arranged so as to be aligned or coaxial with one another. As is shown by way of example in FIGS. 8 and 9, the second through bores 52 can be formed in the tab portions 53 or generally in the tab profiles 53A, 53B and penetrate them completely. In general, the through bores 52 can each extend in the transverse direction C. FIG. 9 shows by way of example that a plurality of second through bores 52 (four through bores are visible in FIG. 9) is provided along the longitudinal direction L. Optionally, a row of second through bores 52, which is lower with respect to the vertical direction H, and an upper row of second through bores 52, which is arranged at a distance from the first row with respect to the vertical direction H, can be provided as shown by way of example in FIG. 9.

As shown by way of example in FIG. 7, the first support frame 2 and the optional second support frame 4 can be plugged onto one another in a simple manner, as indicated by the arrows P. For this purpose, the second plug connection portion 51 of the second support frame 4 is plugged onto the first plug connection portion 31 of the first support frame 2 in the vertical direction H. In the example shown in FIG. 7, in particular, the tab arrangement of the second support frame 4 defined by the profile side walls 51A, 51B is inserted into the recess defined by the profile side walls 31A, 31B of the second longitudinal beam 22 of the first support frame 2.

In order to fasten the plug connection portions 31, 51, which are plugged onto one another or pushed into one another, connecting devices 6 are passed through the through bores 32, 52 as shown schematically in FIG. 8. As already described, the connecting devices 6 can be designed as bolts, rivets, screws or the like. In general, the connecting devices 6 thus comprise a shaft 61 which can be passed through the through bores 32, 52. The connecting device 6 can be secured with respect to the transverse direction, for example, by means of screw bolts 62, as is shown schematically and by way of example in FIG. 8.

The advantage of the plug connection portions 31, 51 each extending in the longitudinal direction L is that a mechanically very robust, in particular torsion-resistant plug connection between the support frames 2, 4 is achieved. Furthermore, as described above, the mounting of the support frames 2, 4 onto one another is facilitated. The launch system 1 can thus be reconfigured in a simple manner, as will be explained in more detail below.

Figure 10:
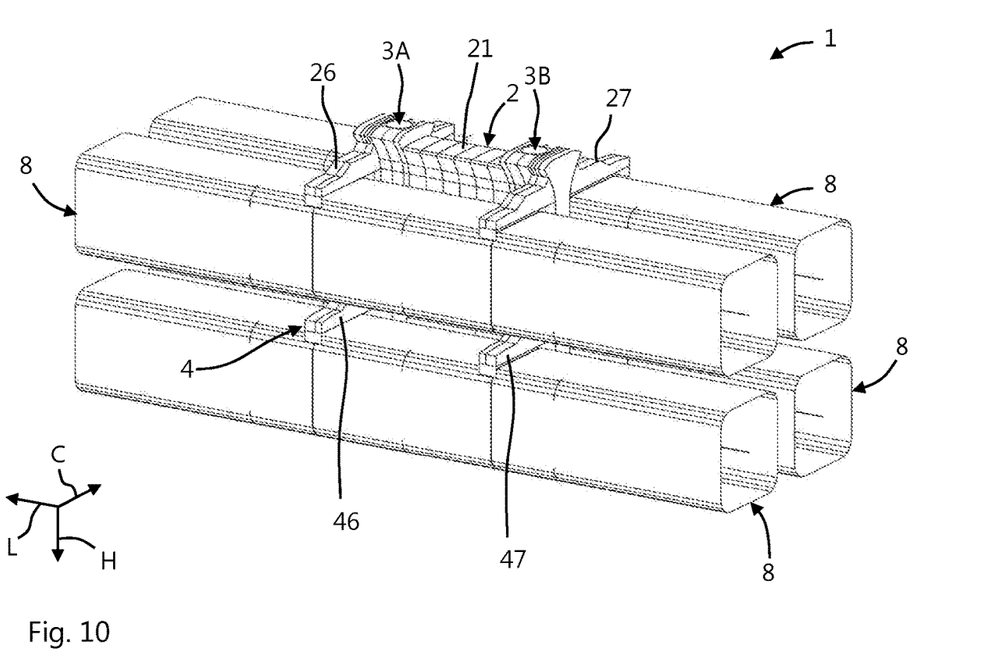
FIG. 10 shows a perspective view of a missile launch system according to a further embodiment of the invention.

FIG. 10 shows a missile launch system 1 by way of example which comprises a first and a second support frame 2, 4 and has two launch tubes 8 fastened to the first support frame 2 and two to the second support frame 4. FIG. 11 shows a sectional view of the system 1 shown in FIG. 10 by way of example. The support frames 2, 4 can be designed as described above and fastened to one another at their connection portions 30, 50 by means of the plug connection portions 31, 51 and the connecting devices (not shown in FIGS. 10 and 11). The support frames 2, 4 shown in FIGS. 10 and 11 by way of example each comprise a front transverse beam 26, 46 and a rear transverse beam 27, 47.

The launch tubes 8 each extend along the longitudinal direction L. As shown in FIGS. 10 and 11 by way of example, the launch tubes 8 can each have a rectangular cross section with rounded corners. Of course, other cross-sectional shapes are also conceivable, for example the launch tubes 8 can have a circular cross section. The launch tubes 8 can, for example, be formed from a thin sheet metal which defines the cross-sectional shape of the launch tube 8. A metal material, for example construction steel or an aluminum alloy, can be used as the material.

As shown, in particular in FIG. 11, a first launch tube 8, 8A is arranged on a first side of the first support frame 2 with respect to the transverse direction C. A second launch tube 8, 8B is arranged on a second side of the first support frame 2 that is opposite the first side with respect to the transverse direction C. As can be seen in FIG. 11, the launch tubes 8A, 8B can extend, with respect to the vertical direction H, substantially over the entire length of the first connecting beam 23 or generally over a distance between the first and the second longitudinal beam 21, 22. The launch tubes 8A, 8B are each connected to the first support frame 2 via a launch tube securing structure 25 of said first support frame. As shown by way of example in FIG. 11, the launch tubes 8A, 8B can each be connected to a launch tube securing structure 25 arranged on the connecting beams 23, 24. Of course, other arrangements of the launch securing structure 25 and thus the fastening of the launch tubes 8A, 8B to the first support frame 2 are likewise conceivable, as shown, for example, in FIGS. 13 to 15.

As also shown in FIG. 11, a third launch tube 8, 8C is arranged on a first side of the second support frame 4 with respect to the transverse direction C. A fourth launch tube 8, 8D is arranged on a second side of the second support frame 4 that is opposite the first side with respect to the transverse direction C. As can be seen in FIG. 11, the launch tubes 8C, 8D can extend, with respect to the vertical direction H, substantially over the entire length of the third connecting beam 43 or generally over a distance between the third and fourth longitudinal beams 41, 42. The launch tubes 8C, 8D are each connected to the second support frame 4 via a launch tube securing structure 45 of said second support frame. As shown by way of example in FIG. 11, the launch tubes 8C, 8C can each be connected to a launch tube securing structure 45 arranged on the connecting beams 43, 44. Of course, other arrangements of the launch tube securing structure 45 and thus the fastening of the launch tubes 8C, 8D to the second support frame 4 are likewise conceivable. The arrangements of the launch tube securing structure 25 shown in FIGS. 13 to 15 by way of example for the first support frame 2 can also be provided on the second support frame 4 in the same way.

FIG. 12 shows, by way of example, a missile launch system 1, which has only a first support frame 2 with two launch tubes 8 each mounted to the frame. The system 1 shown by way of example in FIG. 12 can be easily converted to the system 1 shown in FIGS. 10 and 11 by plugging a second support frame 4, as explained above, onto the connecting portion 30 of the first support frame 2 in the vertical direction H. This allows a 2-way launch system to be converted to a 4-way launch system in a simple manner. The relationships explained in conjunction with FIGS. 10 and 11 relating to the launch tubes 8 and their mounting to the support frame 2 also apply to the system 1 shown by way of example in FIG. 12. FIGS. 13 to 15 show further possible arrangements of the launch tube securing structure 25 on the first support frame 2, which have already been explained.

Figure 16:
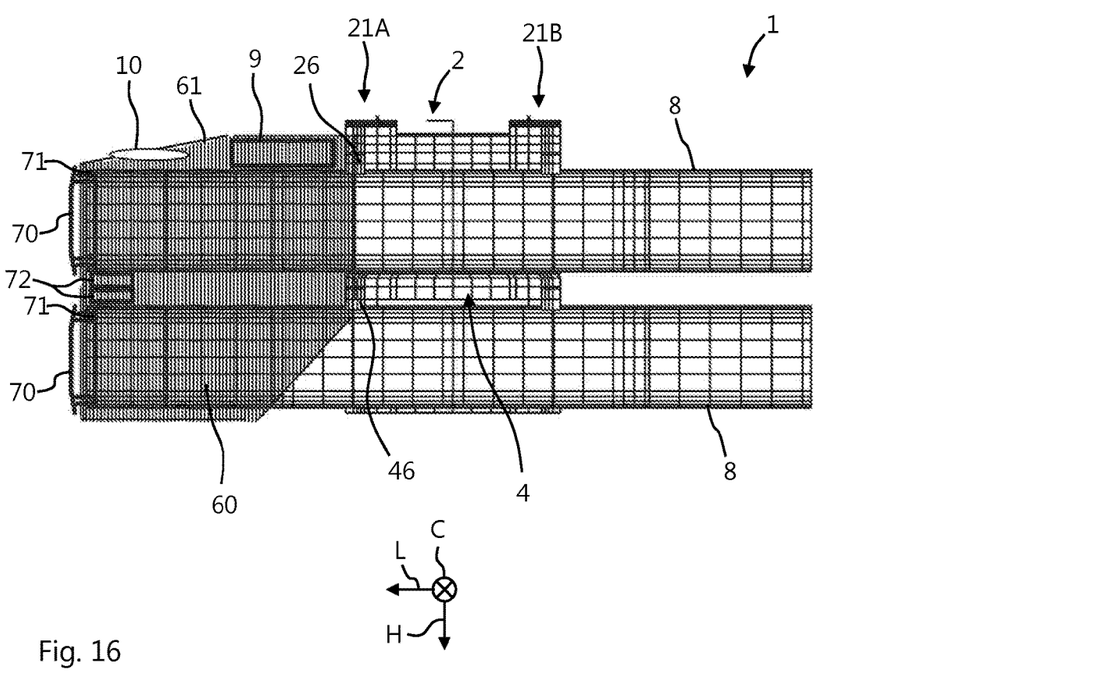
FIG. 16 shows a side view of a missile launch system according to a further embodiment of the invention.

Another missile launch system 1 is shown by way of example in FIG. 16. The system 1 shown in FIG. 16 corresponds to the system 1 shown in FIG. 10 and additionally comprises an optional aerodynamic cladding 60 and optional launch tube covers 70. The cladding 60 is arranged at a front end region of the launch tubes 8 with respect to the longitudinal direction L. As shown by way of example in FIG. 16, the cladding 60 can extend along the longitudinal direction L and end in the region of the first end portion 21A of the first longitudinal beam 21 of the first support frame 2. Furthermore, the cladding 60 preferably extends around the entire common circumference of the launch tubes 8 connected to the support frames 2, 4. The cladding 60 can, in particular, be fastened, for example screwed or similarly connected, to the first connecting beams 23, 43 or to the optional transverse beams 26, 46 of the support frames 2, 4. The cladding 60 can be formed as a shaped sheet metal part from a metal material or as a shaped part from a fiber composite material, for example a carbon fiber-reinforced plastics material. An optional electronic interface 9 of the launch system 1, which can be connected to an electronic interface (not shown) of the mobile platform 100, can be arranged in a receiving portion 61 of the cladding 60, as shown purely by way of example in FIG. 16. Such an optional electronic interface 9 can, for example, also be integrated into the first longitudinal beam 21 of the first support frame 2, for example in the protruding regions 5A, 5B, and thus spatially close to the platform coupling structures 3A, 3B. As also shown by way of example in FIG. 16, optional sensors 10, for example in the form of antennas or the like, can also be arranged in the receiving portion 61 or generally in the cladding 60. Of course, the sensors 10 can also be integrated into other components of the system 1.

The optional launch tube covers 70 are arranged, with respect to the longitudinal direction L, at a front end of the launch tubes 8 and are each rotatably mounted by means of a hinge 71 between a closed position, in which they cover a front opening of the particular launch tube 8, and an open position, in which they release the front opening of the particular launch tube 8. FIG. 16 shows launch tube covers 70 which are shown by way of example in a closed state. As is shown by way of example in FIG. 16, the optional launch tube covers 70 can each be rotatably mounted on the cladding 60 by means of the hinges 71. Alternatively, it is also conceivable for the launch tube covers 70 to be rotatably mounted directly on the launch tubes 8. Actuators 72, for example electromechanical, hydraulic or pneumatic actuators, can be provided for moving the launch tube covers 70 between the closed and open position. These actuators can be arranged, for example, on the optional cladding 60, on the launch tubes 8 or on the support frames 2, 4. FIG. 16 shows by way of example that the actuators 72 are arranged on the cladding 60.

The mobile platform 100 shown by way of example in FIG. 17 in the form of a helicopter comprises two missile launch systems 1, which can be provided as described above. As shown symbolically in FIG. 17, the first support frame 2 can be releasably connected to a support structure 103 of the platform 100 by means of the platform coupling structure 3A, 3B. In FIG. 17, the support structures 103 are shown as lateral transverse beams purely by way of example and only symbolically.

Figure 18:
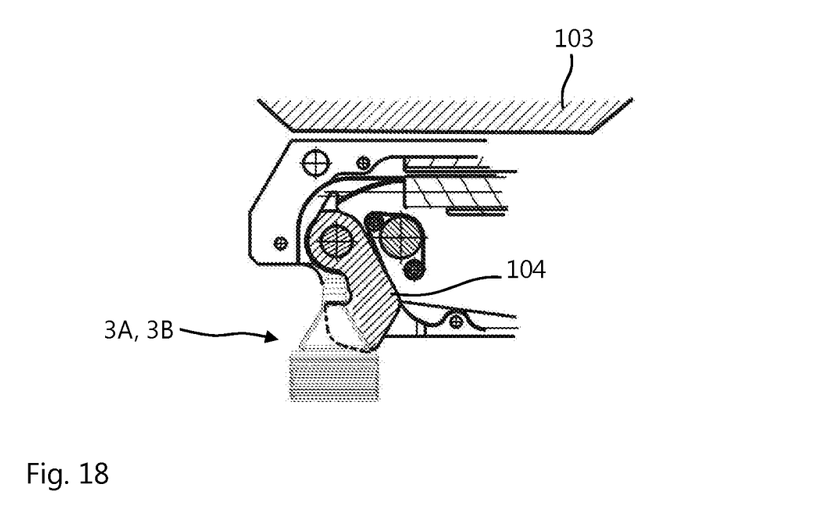
FIG. 18 shows a schematic sectional view of a connection of a missile launch system according to an embodiment of the invention to a mobile platform.

In FIG. 18, a possible detachable connection between the launch system 1 and the mobile platform 100 is shown purely by way of example. A rotatably mounted hook 104 can be provided on the support structure 103 of the platform 100, for example, with said hook engaging in the platform coupling structure 3A, 3B of the first support frame 2, which is provided as a tab in this example.

Although the present invention was explained above using exemplary embodiments, the invention is not restricted thereto but rather can be modified in many ways. In particular, combinations of the preceding exemplary embodiments are conceivable as well.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 102019007557.9, filed Oct. 30, 2019, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

LIST OF REFERENCE SIGNS

1 Missile launch system
2 First support frame
3A First platform coupling structure
3B Second platform coupling structure
4 Second support frame
5A, 5B Protruding regions
6 Connecting devices
8 Missile launch tube
8A-8D First to fourth launch tube 9 Electronic interface
10 Sensors
21 First longitudinal beam
21A First end portion of the first longitudinal beam
21B Second end portion of the first longitudinal beam
22 Second longitudinal beam
22A First end portion of the second longitudinal beam
22B Second end portion of the second longitudinal beam
23 First connecting beam
24 Second connecting beam
25 Launch tube securing structure
26, 27 First transverse beam of the first support frame
26A First transverse beam portion of the first front transverse beam
26B Second transverse beam portion of the first front transverse beam
26i Upper surface
26j Lower surface
27A First transverse beam portion of the first rear transverse beam
27B Second transverse beam portion of the first rear transverse beam
28 Reinforcement strut
30 First connecting structure
31 First plug connection portion
31A, 31B Profile side walls
32, 52 Through bores
41 Third longitudinal beam
41A First end portion of the third longitudinal beam
41B Second end portion of the third longitudinal beam
42 Fourth longitudinal beam
42A First end portion of the fourth longitudinal beam
42B Second end portion of the fourth longitudinal beam
43 Third connecting beam
44 Fourth connecting beam
46, 47 Second transverse beam of the second support frame
46A First transverse beam portion of the second front transverse beam
46B Second transverse beam portion of the second front transverse beam
46i Upper surface
46j Lower surface
47A First transverse beam portion of the second rear transverse beam
47B Second transverse beam portion of the second rear transverse beam
48 Reinforcement profile
50 Second connecting structure
51 Second plug connection portion
51A, 51B Walls
63 Tab portions
53A, 53B Tab profiles
60 Cladding
70 Launch tube covers
71 Hinges
100 Mobile platform
103 Support structures
104 Hook
a26 Distance
a46 Distance
C Transverse direction
H Vertical direction
L Longitudinal direction
l22 Length of the second longitudinal beam
P Arrows

The invention claimed is:

1. Modular missile launch system (1) for launching missiles from a mobile platform (100) having a rectangular first support frame (2), comprising:
a first longitudinal beam (21) extending in a longitudinal direction (L) on which at least one platform coupling structure (3A; 3B) is formed for releasably fastening the first support frame (2) to the mobile platform (100);
a second longitudinal beam (22) extending along the longitudinal direction (L), which is arranged at a distance from the first longitudinal beam (21) in a vertical direction (H) that extends transversely to the longitudinal direction (L) and which, on an underside facing away from the first longitudinal beam (21), comprises a first connecting structure (30), wherein the first connecting structure (30) defines a first plug connection portion (31) extending in the longitudinal direction (L), onto which a second support frame (4) with a second plug connection (51) that is complementary to the first plug connection portion (31) can be plugged in the vertical direction (H) and which comprises at least two first through bores (32) that are spaced apart in the longitudinal direction (L), through each of which one connecting device (6) can be passed in order to secure the first and second support frame (2; 4) to one another when the second support frame (4) is plugged onto to the first support frame (2); and
at least one launch tube securing structure (25) for mounting a missile launch tube (8) to the first support frame (2).

2. System (1) according to claim 1, wherein the first plug connection portion (31) is formed by a recess on the underside of the second longitudinal beam (22) or by a tab arrangement protruding from the underside of the second longitudinal beam (22) in the vertical direction (H).

3. System (1) according to claim 1, wherein the first plug connection portion (31) extends, with respect to the longitudinal direction, over at least 80 percent of a length (l22) of the second longitudinal beam (22).

4. System (1) according to claim 1, wherein the first support frame (2) comprises at least one first transverse beam (26; 27) extending transversely to the longitudinal beams.

5. System (1) according to claim 4, wherein at least one launch tube securing structure (25) of the first support frame (2) is formed on the first transverse beam (26; 27).

6. System (1) according to claim 4, wherein the at least one first transverse beam (26; 27) is integrally formed with one of the beams from the group consisting of the first longitudinal beam (21), the second longitudinal beam (22), a first connecting beam (23) connecting the first and the second longitudinal beam (21; 22), and a second connecting beam (24) connecting the first and the second longitudinal beam (21; 22).

7. System (1) according to claim 4, wherein the at least one first transverse beam (26; 27) is arranged in the region of the first longitudinal beam (21) with respect to the vertical direction (H).

8. System (1) according to claim 1, wherein the first support frame (2) additionally comprises at least one reinforcement strut (28), which is located between two beams from the group consisting of the first longitudinal beam (21), the second longitudinal beam (22), a first connecting beam (23) connecting the first and the second longitudinal beams (21; 22), and a second connecting second connecting beam (24) connecting the first and the second longitudinal beams (21; 22).

9. System (1) according to claim 1, further comprising:
at least one launch tube (8) which can be or is connected to the at least one launch tube securing structure (25) of the first support frame (2).

10. System (1) according to claim 1, further comprising at least two connecting devices (6) and a rectangular second support frame (4), which comprises:
a third longitudinal beam (41) which extends in a longitudinal direction (L) and comprises a second connecting structure (50) on an upper side, wherein the second connecting structure (50) defines a second plug connection portion (51) that extends in the longitudinal direction (L) and is complementary to the first plug connection portion (31), which second plug connection portion is able to be plugged onto the first plug connection portion (31) of the first support frame (2) in the vertical direction (H) and which comprises at least two second through bores (52) that are arranged such that they correspond with the first through bores (32) in the longitudinal direction (L), wherein the connecting devices (6) can be passed through the first and the second through bores (32; 52) in order to secure the first and the second support frame (2; 4) to one another when the second support frame (4) is plugged onto the first support frame (2) and at least one launch tube securing structure (45) for mounting a missile launch tube (8) to the second support frame (4).

11. System (1) according to claim 10, wherein the second plug connection portion (50) is formed by a tab arrangement protruding from the upper side of the third longitudinal beam (41) in the vertical direction (H) or by a recess formed on the upper side of the third longitudinal beam (41).

12. System (1) according to claim 10, wherein the second plug connection portion (50) extends, with respect to the longitudinal direction, over at least 80 percent of a length (l41) of the third longitudinal beam (41).

13. System (1) according to claim 1, wherein the through bores (32; 52) each extend in a transverse direction (C) extending transversely to the vertical direction (H) and the longitudinal direction (L).

* * * * *